(No Model.) 2 Sheets—Sheet 1.
R. B. LUMPKIN & G. OGDEN.
SAW COTTON GIN.
No. 552,382. Patented Dec. 31, 1895.
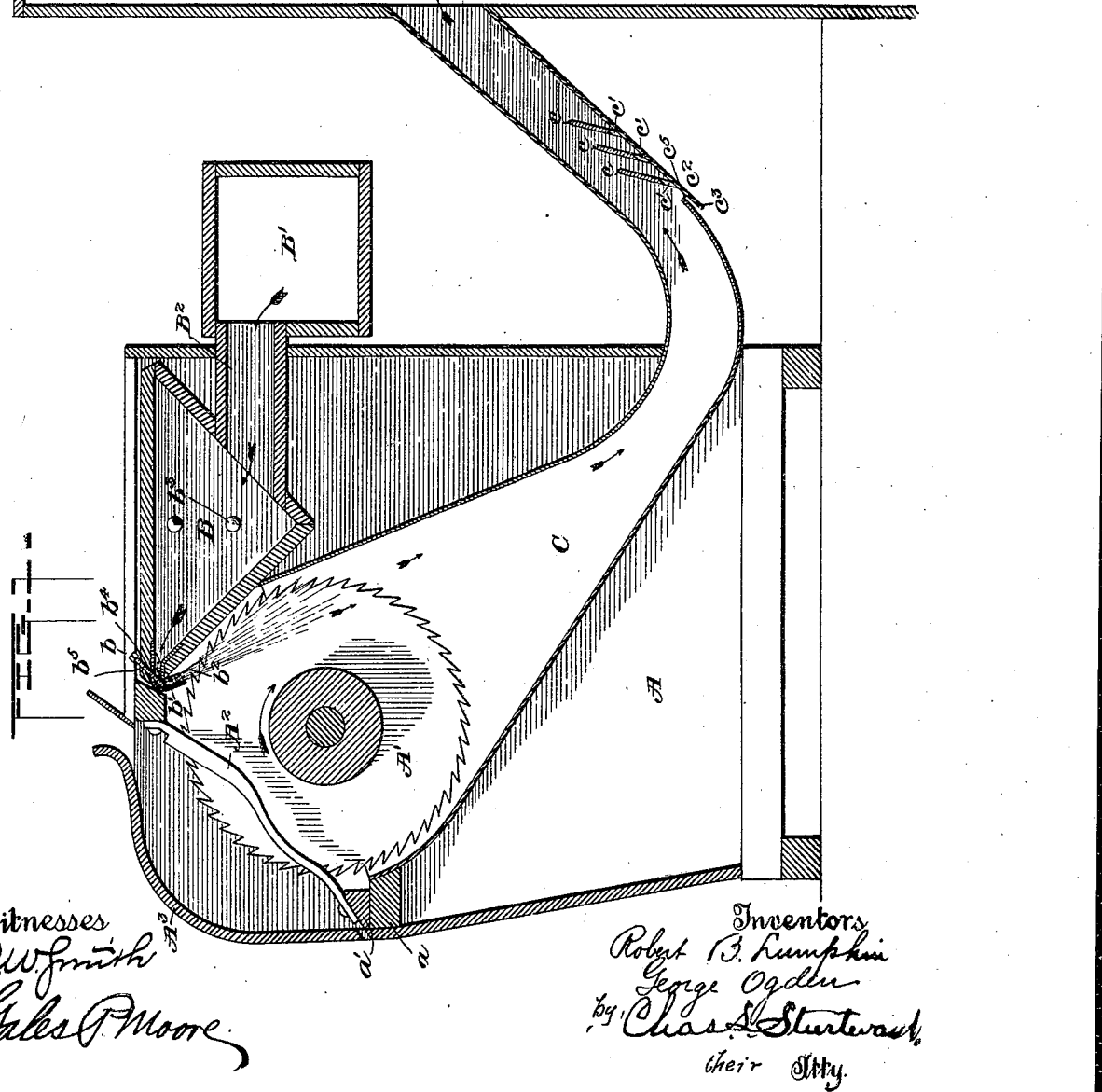
Witnesses
C. W. Smith
Gales P. Moore
Inventors
Robert B. Lumpkin
George Ogden
by Chas. A. Sturtevant
their Atty.

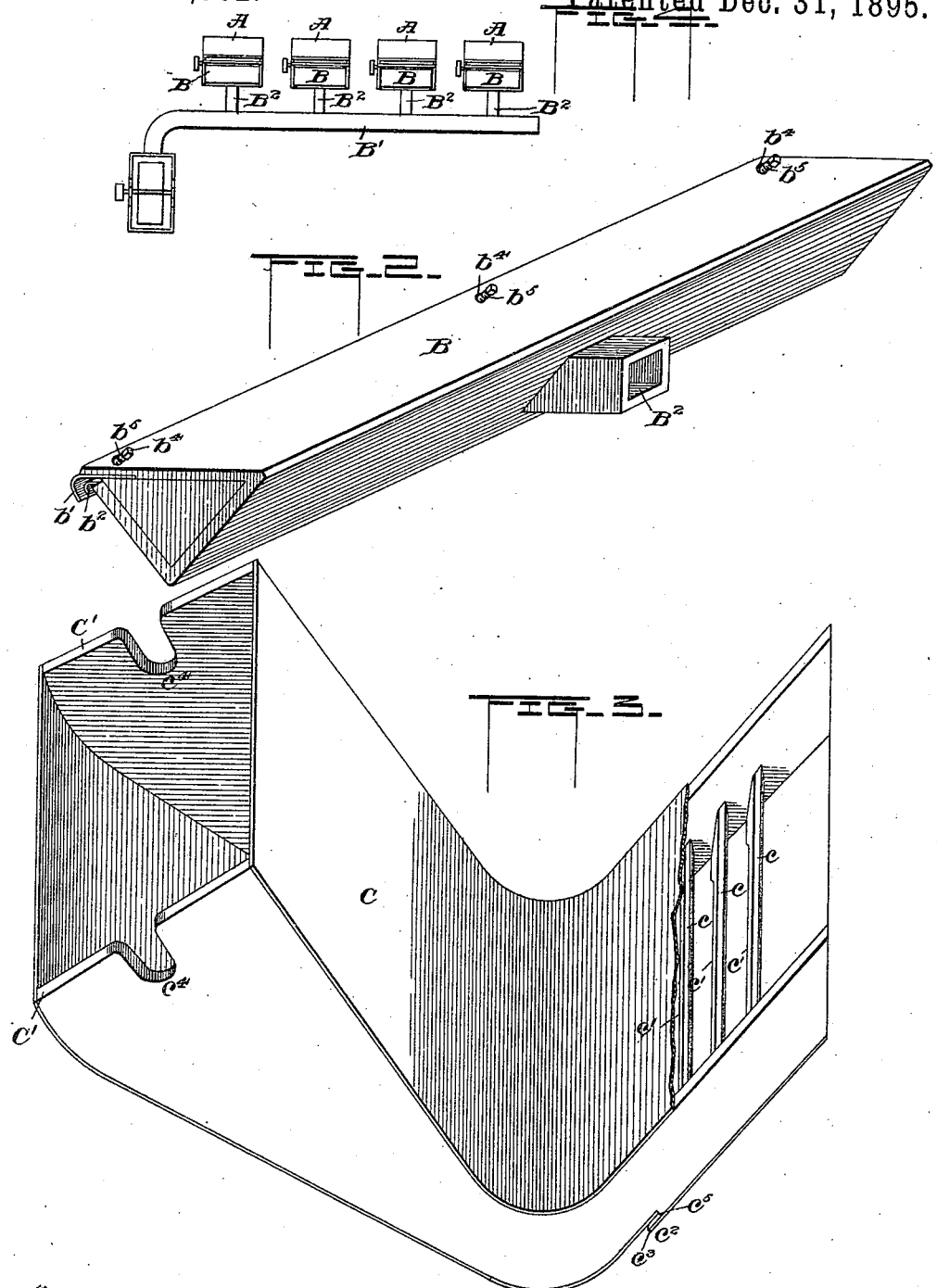

UNITED STATES PATENT OFFICE.

ROBERT B. LUMPKIN AND GEORGE OGDEN, OF FALLS COUNTY, TEXAS.

SAW COTTON-GIN.

SPECIFICATION forming part of Letters Patent No. 552,382, dated December 31, 1895.

Application filed May 6, 1895. Serial No. 548,258. (No model.)

*To all whom it may concern:*

Be it known that we, ROBERT B. LUMPKIN and GEORGE OGDEN, citizens of the United States, residing in the county of Falls, State of Texas, have invented certain new and useful Improvements in Saw Cotton-Gins, of which the following is a description, reference being had to the accompanying drawings, and to the letters of reference marked thereon.

Our invention relates to cotton-gins, and more particularly to pneumatic means for removing the lint from the gin-saws, our object being to provide a construction by the use of which the cotton will be taken from the saw-teeth in the condition of down and not in a tufted or ropy state.

A further object is to provide means for cleaning the motes and other impurities from the staple.

The accompanying drawings illustrate our invention, in which—

Figure 1 is a sectional elevation of a gin equipped with our invention. Fig. 2 is a perspective of the air-chamber. Fig. 3 is a perspective of the cotton-chute leading from the saws to the condenser, and Fig. 4 is a diagram showing a series of gins equipped with the present invention.

Referring now more particularly to the drawings, A represents the cotton-gin as a whole, having the usual saws $A'$, ribs $A^2$, seed-board $A^3$, and lower and upper jam-beams $a\,a'$.

Between the top beam of the gin and the saws $A'$ is placed an air-chamber B, which with its attendant parts is the main feature of the present invention. This air-chamber is preferably triangular in cross-section, as shown, the upper side lying substantially parallel to or against the top beam of the gin. It extends entirely across the saws and is held in place in any suitable manner, as by the bolts $b^3$. Air is supplied to the chamber by a tube $B^2$ leading from an air-duct $B'$. The chamber B is open along its forward edge, as shown at $b$, this opening extending across all of the saws which are to be acted upon, and being produced in the present instance by shortening the forward wall of the chamber so that it does not meet the upper wall, while the air is directed against the saws by a suitable conductor, preferably consisting of lips of metal $b'\,b^2$ set into the walls of the chamber B in order to present an unbroken surface for the passage of the air, the most advantageous construction being that shown, in which the upper lip $b'$ extends slightly below the lower lip $b^2$.

In some instances it is found advantageous to vary the width of the opening between the ends of the plates $b'\,b^2$, and in order to effect this adjustment the top of the chamber near its forward edge is provided with a threaded opening $b^4$, through which there extends a threaded bolt $b^5$, which bears upon one of the plates, preferably $b'$. These plates are made from metal having a certain amount of resiliency, so that while they normally tend to retain the angle at which they are initially bent this angle can be varied by the action of the bolt $b^5$ and the opening correspondingly regulated.

It will be understood that each of the several gins constituting a battery is provided with a chamber B, as above described, and these chambers are each connected to an air-duct $B'$, which entends across the entire battery and is connected to a fan or other suitable air-blast generator.

A chute C leads from the saws to the usual condenser D, and in this chute is located our means for catching the dirt which may be in the staple. The chute rises to meet the condenser at quite an angle, as shown, and across the inclined plane thus produced there extend a series of slats $c$, which project at an angle to the bottom of the chute. These slats have preferably inclined upper edges, as shown, and do not reach through their major portion quite to the bottom of the chute, thus leaving a small space $c'$ under each slat. Below the lowest slat of the series there is an opening $c^2$ in the bottom of the chute C, and preferably a lip $c^3$ projects from the lower side of this opening a slight distance under the bottom of the chute immediately in front of the opening.

As will be more fully hereinafter explained, the best results are effected by making the chute of such a size that it fits rather snugly about the saws, just leaving sufficient space for their action, and to this end recesses $c^4$ are formed in the sides $C'$ for the reception of the saw-carrying shaft.

In order to produce the opening $c^2$ and lip $c^3$ above referred to, the sides of the chute are formed, as shown in Fig. 3, with a shoulder $c^5$, one of the bottom pieces resting against the shoulder and the other extending a little beyond it. As the shoulder is of a depth greater than the thickness of the material from which the bottom of the chute is constructed, this will produce the opening $c^2$ and the projecting plate will produce the lip $c^3$.

In operation the blast of air begins to act upon the lint on the saw-teeth as soon as the tooth carrying the lint comes in line with the lips. It will be noticed that the lips are so placed that they are at an angle to the top of a tooth when it first comes under the discharge-opening, so that the air-blast is primarily at an angle to said top of the tooth. It will be seen also that this air-blast, being arranged outside the saws and moving in the direction of the rotation of the saws, passes across a segment of said saws, and by reason of the position of the lips with respect to the tooth passing adjacent the air-blast opening the staple which has been taken from the seed in a tuft is first blown more firmly upon the tooth, and in the passage around the segment included within the power of the air-blast all dirt and grit is blown out of the staple and the fibers thoroughly straightened, so that by the time the tooth comes within the direct line of the blast and the staple is blown therefrom it has been thoroughly cleaned and the fibers straightened, so that it is in a perfectly clean and downy state. Another advantage of this arrangement is that in case wet cotton is being ginned it is thoroughly dried under the influence of the strong blast of air while it is passing around the periphery of the segment covered by the air-blast. Again, there is a certain amount of disintegration of the fibers while they pass over this space. By this relation of the air-blast to the teeth very improved results over other air-blast gins which have been heretofore proposed are secured in that, in the latter, in the only one of which we are aware where the air-tubes project between the gin-saws and the blast is at a right angle to the direction of movement of the same, the staple is blown off the tooth in exactly the same condition in which it was seized from the seed, and thus no cleaning, drying, or straightening action goes on while the staple is on the tooth. As herein shown, the staple is blown from the saw-tooth into the chute. The staple then passes along said chute to the condenser, the cotton being carried by the air above the slats $c$, while the dirt and motes fall and strike against said slats, the motes then passing out of the opening $c^2$.

We are aware of the patent granted Robert King, December 5, 1893, No. 510,269, and make no claim to being the first to remove lint-cotton from gin-saws by a blast of air, as shown in said patent, in which, depending from the cylindrical air-tube, are smaller tubes which extend some distance between the saws and are then bent at about a right angle to direct the blast of air operatively against the saw-teeth, the lint being blown into a duct leading into a condenser. In this construction each saw revolves between two depending tubes, and the orifice of each tube is below the circumference of the saw, whereby several parallel blasts of air come from between the saws. In our construction, however, by arranging the air-blast in the manner shown we dry, clean, and straighten the fiber of the cotton as it passes around on the saw-teeth between the point where the air-blast first strikes it and the point where it is blown off.

By the present construction the several tubes are avoided and one continuous discharge-opening extends above all of the saws to be operated upon. In this way all clogging at the sides of the saws is effectually prevented, and by placing the discharge-opening above the saws and not below their circumferences, the air acts upon not only the sides but also the top of teeth, whereby each tooth is cleaned independently and the staple, instead of entering the condenser in a more or less ropy or tufted condition, passes to it as down. Furthermore, the chute and air-chamber fitting the saws as snugly as is provided for in the present construction, the cotton in the breast prevents an ingress of outside air except through the air-chamber B, and the intensity of the blast can thus be positively regulated.

The angular form of the air-chamber of course permits the air to be concentrated as it acts upon the saws, and the area of the chute permits the expansion of the air before it enters the condenser. The inclined portion of the chute carrying the slats $c$ is preferably made of polished material to facilitate the falling of the motes, and the lip $c^3$ extending as it does the motes are not blown from the chute over a large space, as would be the case were no lip provided, but on the other hand all trash collected by the slats and the bottom of the chute falls by its weight only into a small area.

Having thus described our invention, what we claim as new, and desire to secure by Letters Patent, is—

1. In a cotton gin the combination with the gin saws, of means for subjecting the tops of the lint bearing teeth to a blast of air and directing the blast primarily at an angle to the tops of said teeth when bearing lint, then across a segment of the saws and substantially toward the direction of rotation of said saws; substantially as described.

2. In a cotton gin the combination with the gin saws, of an air blast chamber, depending lips projecting from said air blast chamber and forming between them a continuous opening, at an angle to the tops of the saw teeth and in the line of movement of the saws, whereby a continuous draft of air is applied to the tops of the teeth as well as on either side of the saws, across a segment thereof whereby the staple in passing from the point of its contact with the air blast to the point where it was blown off is dried, cleaned and the fibers straightened; substantially as described.

3. The combination in a cotton gin with the gin saws, and seed board, of a closed chamber inclosing all of said saws except the portion for acting upon the cotton, said chamber being provided with a duct for leading off the fiber, and means for directing a current of air upon the saws and into said closed chamber; substantially as described.

4. The combination in a cotton gin with the top beam, sides, seed board and saws, of an air chamber between the saws and the top beam for directing air to the saw teeth and a chute fitting against said air chamber and snugly inclosing the saws, whereby when the breast contains cotton the chute is closed against entrance of air except through the air chamber, and means for supplying air to the air chamber substantially as described.

5. The combination in a cotton gin with the top beam, sides, seed board and saws, of an air chamber between the saws and the top beam for directing air to the saw teeth, and a chute fitting against said air chamber, the sides of said chute having recesses for the reception of the saw-carrying shaft, whereby when the breast contains cotton the chute is closed against entrance of air except through the air chamber; substantially as described.

6. An air chamber for saw-gins and the like comprising a triangular receptacle, one of the side walls of which is shorter than the distance between the two other side walls at the side on which said first mentioned wall is located, thus forming a discharge opening across one of the angles of the receptacle, and an entrance orifice upon the side of the receptacle opposite said discharge opening; substantially as described.

7. An air chamber for saw gins and the like comprising a receptacle provided with a discharge opening, an orifice for the entrance of air, and means for regulating the amount of air discharged; substantially as described.

8. An air chamber for saw gins and the like comprising a receptacle provided with a discharge opening, and an orifice for the entrance of air, one of the walls of the discharge opening being adjustable to regulate the amount of air discharged; substantially as described.

9. An air chamber for saw-gins and the like comprising a receptacle having a discharge opening therein, a lip extending from said opening, means for moving said lip to regulate the amount of opening, and an orifice for the entrance of air; substantially as described.

10. An air chamber for saw-gins and the like comprising a receptacle having a discharge opening therein, a movable lip extending from said opening, an adjustable bolt bearing upon said lip and seated in a fixed portion of the receptacle and an orifice for the entrance of air; substantially as described.

11. An air chamber for saw-gins and the like comprising a receptacle having a discharge opening therein, a movable lip extending from said opening, a threaded seat in a fixed portion of the receptacle, a threaded bolt in said seat and bearing upon said lip, and an orifice for the entrance of air substantially as described.

12. An air chamber for saw-gins and the like comprising a receptacle having a discharge opening therein, a lip of resilient material extending from said opening, means for bending said lip to vary the size of the discharge orifice, and an orifice for the entrance of air; substantially as described.

13. A chute for cotton gins and the like having an inclined bottom, a series of slats across said bottom, and having a passage between the slats and the bottom, and an opening in the chute below the lowest slat; substantially as described.

14. In an air chute provided with means for intercepting the passage of dirt and having an opening for the exit of said dirt, a lip extending from said opening in a direction opposite to that of the passage of air; substantially as described.

15. An air chute for cotton gins and the like having an inclined bottom, said chute at said inclined portion being provided with means for intercepting the passage of dirt, and having an opening in the chute below said means for the exit of said dirt, and a lip extending from said opening in a direction opposite to that of the passage of air; substantially as described.

16. A chute for saw-gins and the like comprising sides having an inclined portion, a shoulder in said inclined portion, a top plate connecting said sides, a bottom plate between said sides along the space above the shoulder, said bottom plate projecting below the shoulder to form a lip, and a second bottom plate between the sides, said bottom plate being of a thickness less than the depth of the shoulder and extending toward the shoulder above the lip formed by the first mentioned bottom plate; substantially as described.

In testimony whereof we affix our signatures in presence of two witnesses.

ROBERT B. LUMPKIN.
GEORGE OGDEN.

Witnesses:
OSCAR LUMPKIN,
JACK HUNTER.